(12) United States Patent
Ku

(10) Patent No.: US 10,773,747 B2
(45) Date of Patent: Sep. 15, 2020

(54) STEERING COLUMN FOR VEHICLE

(71) Applicant: MANDO CORPORATION, Pyeongtaek-si, Gyeonggi-do (KR)

(72) Inventor: Sang Chul Ku, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 122 days.

(21) Appl. No.: 16/190,751

(22) Filed: Nov. 14, 2018

(65) Prior Publication Data

US 2019/0152512 A1    May 23, 2019

(30) Foreign Application Priority Data

Nov. 17, 2017   (KR) .......................... 10-2017-0154313

(51) Int. Cl.
  *B62D 1/19*        (2006.01)
  *B62D 1/181*       (2006.01)

(52) U.S. Cl.
  CPC ............. *B62D 1/192* (2013.01); *B62D 1/181* (2013.01); *B62D 1/195* (2013.01)

(58) Field of Classification Search
  CPC ......... B62D 1/192; B62D 1/181; B62D 1/195
  See application file for complete search history.

(56) References Cited

U.S. PATENT DOCUMENTS

| 2,548,244 | A  | * | 4/1951  | Stein | ...................... | B62D 1/192 |
| | | | | | | 74/492 |
| 10,457,313 | B2 | * | 10/2019 | Nash | ...................... | B62D 1/181 |

FOREIGN PATENT DOCUMENTS

WO        WO-9620862 A1  *  7/1996  ............. F16D 3/065

* cited by examiner

*Primary Examiner* — Faye M Fleming
(74) *Attorney, Agent, or Firm* — Morgan, Lewis & Bockius LLP

(57) ABSTRACT

A steering column for a vehicle includes: a column tube coupled to an outer side of a steering shaft and having a collapse elongated-hole extending in an axial direction; a column housing coupled to an outer circumferential surface of the column tube and having a telescopic elongated-hole extending axially to correspond to the collapse elongated-hole; a support cylinder coupled between the column tube and the column housing and having an insertion hole, into which an insertion shaft passing through the telescopic elongated-hole and the collapse elongated-hole from an outer side of the column housing is inserted, and a support hole penetrating through the support cylinder in the axial direction; and a bending clip having a first end fixed to an inner circumferential surface of the column tube and a second end folded to be inserted into the support hole while wrapping an end of the support cylinder.

20 Claims, 10 Drawing Sheets

STEERING COLUMN FOR VEHICLE

CROSS REFERENCE TO RELATED APPLICATION

This application claims priority from Korean Patent Application No. 10-2017-0154313, filed on Nov. 17, 2017, which is hereby incorporated by reference for all purposes as if fully set forth herein.

TECHNICAL FIELD

The present disclosure relates to a steering column for a vehicle, and more particularly, to a vehicular steering column, in which a collapsable and slidable component can smoothly collapse without interfering with a fixed component at the time of vehicular collision, and adjustment of a collapse load of the steering column can be facilitated.

BACKGROUND

In general, a vehicular steering column includes a telescopic function and a tilt function, which allow a driver to adjust the degree of protrusion and tilt angle of the steering wheel to be suitable for his/her height or body shape so as to perform a smooth steering operation.

Such a vehicular steering column has several problems, for example, it is necessary to mount separate structures and a number of components in order to mount collision energy absorption components such as a capsule coupled to a mounting bracket, a tearing plate, and a bending plate such that collision energy can be absorbed during vehicular collision. Accordingly, in order to manufacture and assemble such components, the number of components and the number of manufacturing processes are increased.

In addition, a shock absorption of the general vehicular steering column, in which a primary load is absorbed by fracture of the capsule and then a secondary load is absorbed by the tearing plate by breaking a tearing groove that faints a recess having a predetermined depth, has several problems, for example, it is complicated to manufacture the components and a lateral deviation of the load may occur due to the interference with peripheral components since deformation is generated vertically.

SUMMARY

The exemplary embodiments disclosed herein have been made in view of the above background, and are directed to a vehicular steering column, in which a collapsable and slidable component smoothly collapses at the time of vehicular collision without interfering with a fixed component.

In addition, the exemplary embodiments disclosed herein are directed to a vehicular steering column, in which adjustment of a collapse load of the steering column is facilitated at the time of vehicular collision, collision performance is improved by adjusting the collapse load according a collision characteristic for each type of vehicle, and the number of components, the number of assembly processes, and costs are reduced.

Further, the aspect of the present disclosure is not limited thereto, and other unmentioned aspects of the present disclosure may be clearly appreciated by those skilled in the art from the following descriptions.

According to an exemplary embodiment of the present disclosure, a steering column for a vehicle includes: a column tube coupled to an outer side of a steering shaft and having a collapse elongated-hole extending in an axial direction at one side of the column tube; a column housing coupled to an outer circumferential surface of the column tube and having a telescopic elongated-hole extending axially at one side of the column housing to correspond to the collapse elongated-hole; a support cylinder coupled between the column tube and the column housing and having an insertion hole, into which an insertion shaft passing through the telescopic elongated-hole and the collapse elongated-hole from an outer side of the column housing is inserted, and a support hole penetrating through the support cylinder in the axial direction; and a bending clip having a first end fixed to an inner circumferential surface of the column tube and a second end folded to be inserted into the support hole while wrapping an end of the support cylinder, such that at a time of vehicular collision, the bending clip moves in the axial direction together with the column tube while being plastically deformed.

As described above, according to the exemplary embodiments disclosed herein, a collapsable and slidable component smoothly collapses at the time of vehicular collision without interfering with a fixed component.

In addition, according to embodiments disclosed herein, adjustment of a collapse load of the steering column can be facilitated at the time of vehicular collision, collision performance can be improved by adjusting the collapse load according a collision characteristic for each type of vehicle, and the number of components, the number of assembly processes, and costs can be reduced.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
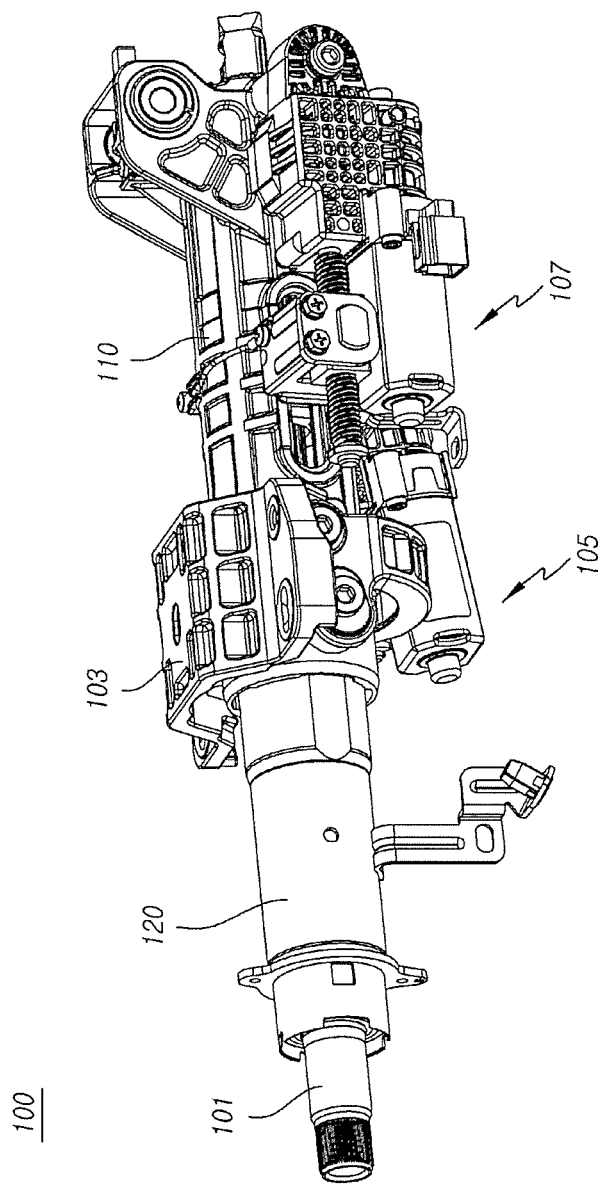
FIG. 1 is a perspective view illustrating a vehicular steering column according to an exemplary embodiment of the present disclosure.

Hereinafter, exemplary embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence, and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
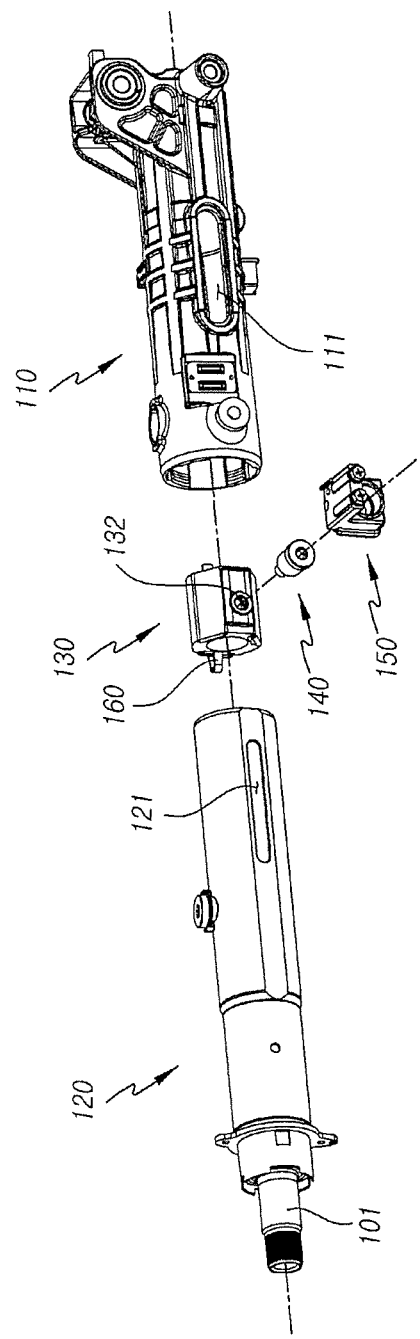
FIG. 2 is an exploded perspective view of FIG. 1.
Figure 3:
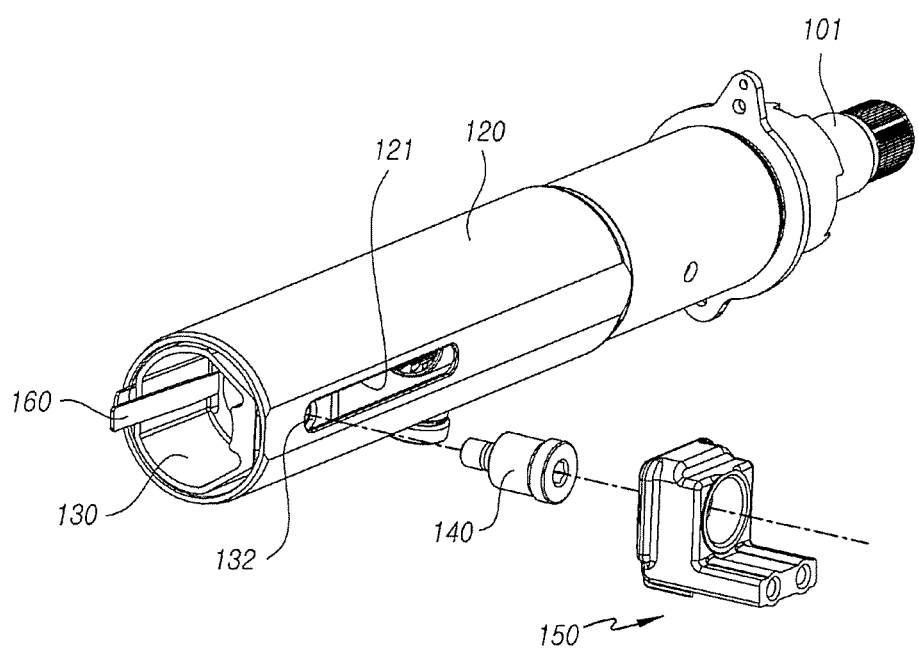
FIG. 3 is an exploded perspective view illustrating a portion of a vehicular steering column according to an exemplary embodiment of the present disclosure.
Figure 4:
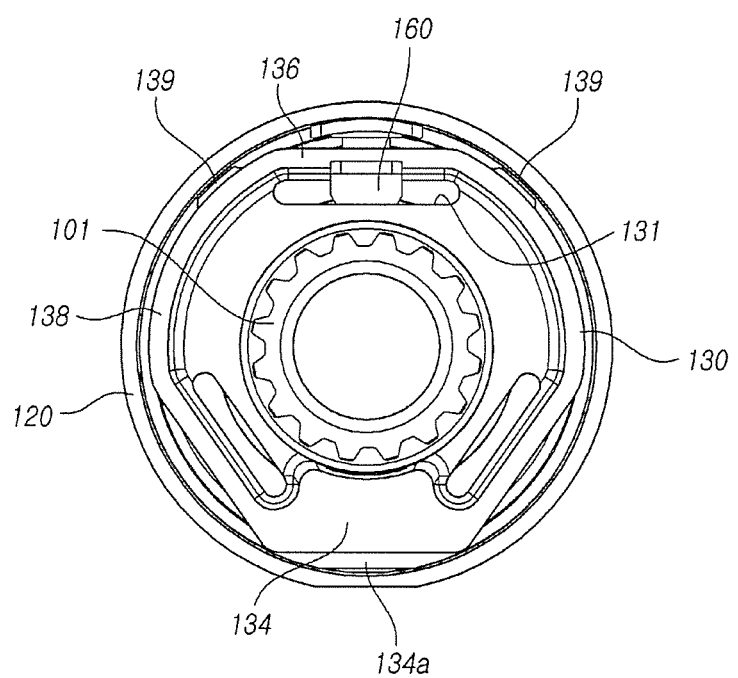
FIG. 4 is a front view of FIG. 3.
Figure 5:
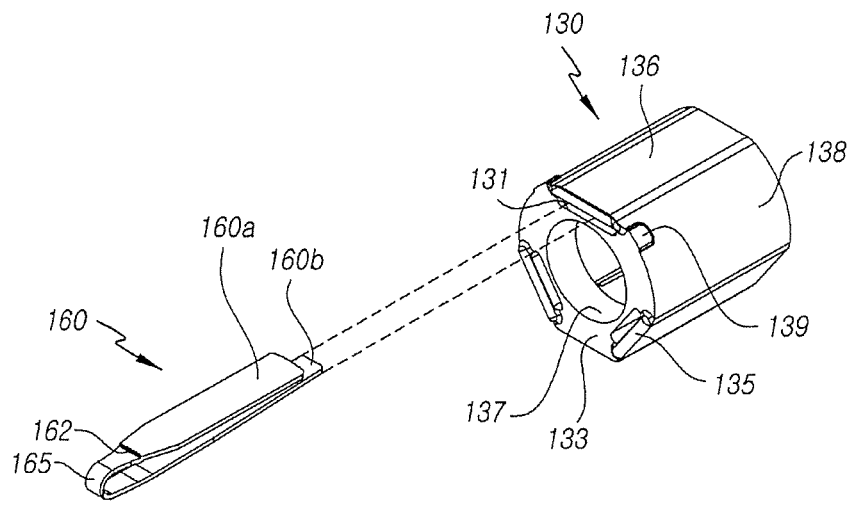
FIGS. 5 and 6 are perspective views each illustrating a portion of a vehicular steering column according to an exemplary embodiment of the present disclosure.
Figure 6:
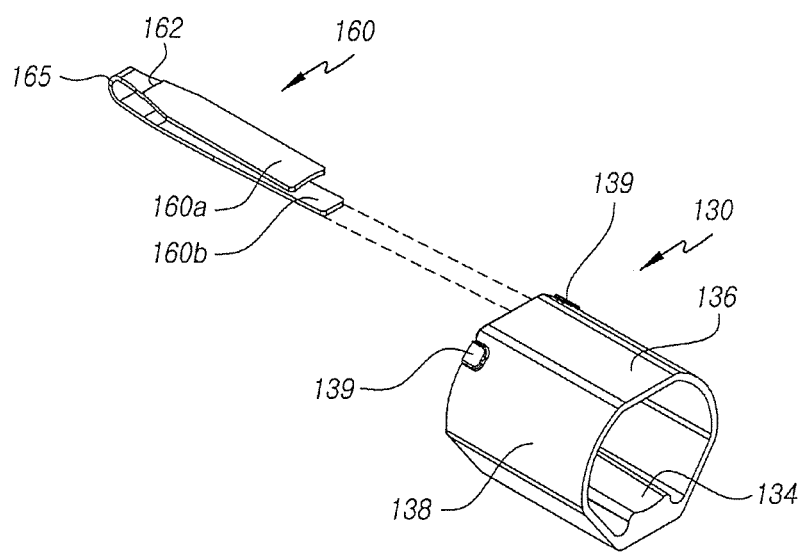
Figure 7:
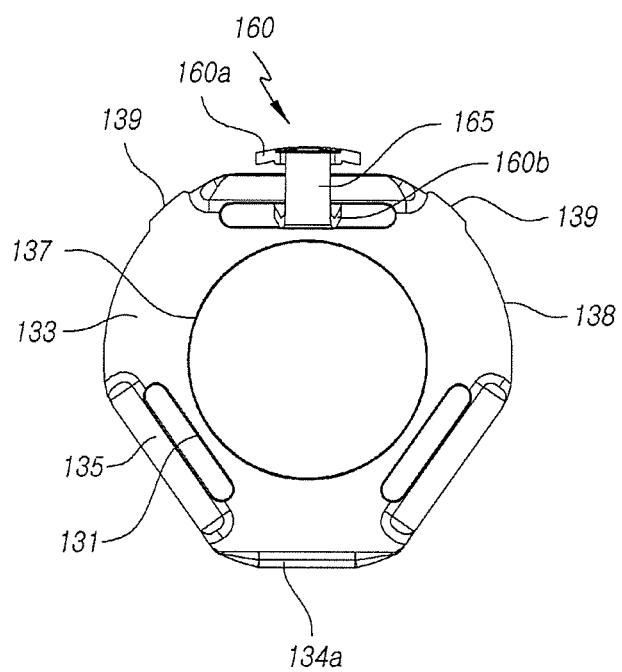
FIG. 7 is a front view illustrating a portion of a vehicular steering column according to an exemplary embodiment of the present disclosure.
Figure 8:
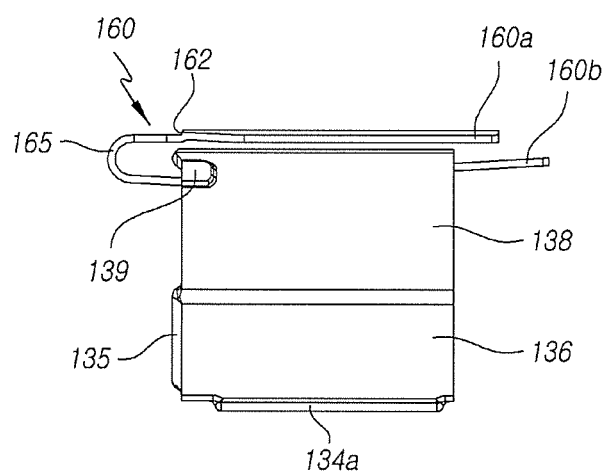
FIG. 8 is a side view of FIG. 7.
Figure 9:
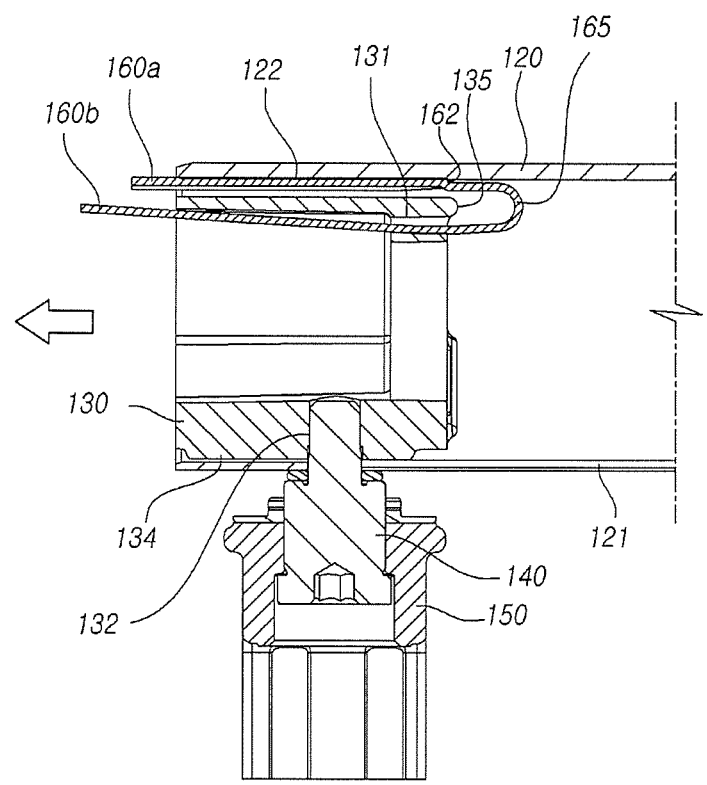
FIGS. 9 and 10 are cross-sectional views each illustrating the state in which a vehicular steering column according to an exemplary embodiment of the present disclosure collapses and slides.
Figure 10:
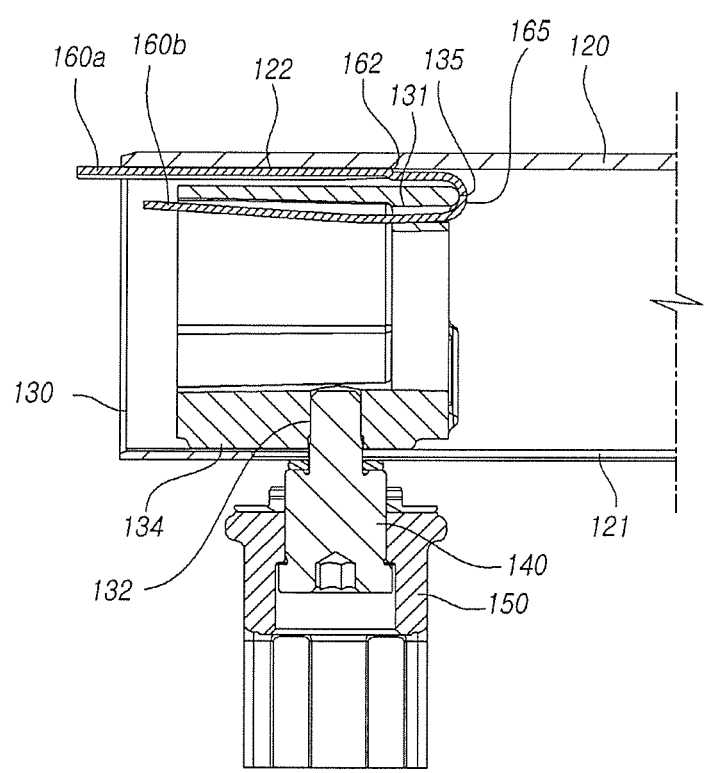

FIG. 1 is a perspective view illustrating a vehicular steering column according to embodiments disclosed herein, and FIG. 2 is an exploded perspective view of FIG. 1. FIG. 3 is an exploded perspective view illustrating a portion of a vehicular steering column according to embodiments disclosed herein, and FIG. 4 is a front view of FIG. 3. FIGS. 5 and 6 are perspective views each illustrating a portion of a vehicular steering column according to embodiments disclosed herein. FIG. 7 is a front view illustrating a portion of a vehicular steering column according to embodiments disclosed herein, and FIG. 8 is a side view of FIG. 7. FIGS. 9 and 10 are cross-sectional views each illustrating the state in which a vehicular steering column according to embodiments disclosed herein collapses and slides.

As illustrated in these drawings, a vehicular steering column 100 according to an exemplary embodiment of the present embodiment includes: a column tube 120 coupled to an outer side of a steering shaft 101 and having an collapse-elongated hole 121 extending axially in one side thereof; a column housing 110 coupled to an outer circumferential surface of the column tube 120 and having a telescopic elongated-hole 111 extending axially in one side thereof so as to correspond to the collapse elongated-hole 121; a support cylinder 130 coupled between the column tube 120 and the column housing 110 and having an insertion hole 132, into which an insertion shaft 140 passing through the telescopic elongated-hole 111 and the collapse elongated-hole 121 from the outside of the column housing 110 is inserted, and a support hole 131 axially penetrate through the support cylinder 130; and a bending clip 160 having one end 160a fixed to the inner circumferential surface of the column tube 120 and a remaining end 160b bent to be inserted into the support hole 131 while wrapping an end of the support cylinder 130 such that at the time of vehicular collision, the bending clip 160 moves axially together with the column tube 120 while being plastically deformed.

The vehicular steering column 100 may be an electric steering column in which the column tube 120 inserted into the column housing 110 is telescopically movable in the axial direction, and includes a structure in which the column tube 120 absorbs collision energy while collapsing toward the housing 110 at the time of vehicular collision.

The column tube 120 is coupled to the outside of the steering shaft 101, which transmits a steering force when a driver operates a steering wheel, to enclose the steering shaft 101 and is inserted into the column housing 110 such that at the time of vehicular collision, a collapsing operation is performed so as to cause the column tube 120 to slide toward the column housing 110. The column housing 110, into which the column tube 120 is inserted, is fixed to the vehicle body by a mounting bracket 103.

The column tube 120 has a hollow shape and is inserted into the inner circumferential surface of the column housing 110 so as to perform an axial sliding movement toward the inside of the column housing 110 during the collapsing operation.

Since the column tube 120 has the collapse elongated-hole 121 extending in one side surface in the axial direction, the collapsing operation can be performed by the length of the collapse elongated-hole 121 in the axial direction, i.e. in the collapsing direction.

The hollow column housing 110 includes an energy absorption structure such that at the time of vehicular collision, the column housing 110 is able to absorb the collision energy while performing the collapsing operation together with the column tube 120.

That is, the column housing 110 is coupled to the outer circumferential surface of the column tube 120 while enclosing the column tube 120 inserted therein. The column housing 110 includes a telescopic elongated-hole 111 disposed in one side surface thereof to correspond to the collapse elongated-hole 121 in the column tube 120 at one end portion thereof, into which the column tube 120 is inserted.

In the side surface of the column housing 110, a tilt driver 105 is configured to perform the tilt operation of the steering column and a telescopic driver 107 is configured to perform the telescopic operation of the steering column.

The steering column 100 has the support cylinder 130 coupled between the column tube 120 and the column housing 110 and having the insertion hole 132, into which the insertion shaft 140 passing through the telescopic elongated-hole 111 and the collapse elongated-hole 121 from the outside of the column housing 110 is inserted, and the support hole 131, which penetrates through the support cylinder 130 in the axial direction.

In addition, the steering column has the bending clip 160 having the one end 160a fixed to the inner circumferential surface of the column tube 120 and the remaining end 160b bent to be inserted into the support hole 131 while wrapping an end of the support cylinder 130 such that at the time of vehicular collision. The bending clip 160 moves axially together with the column tube 120 while being plastically deformed.

The support cylinder 130 includes an end partition wall 133 disposed at one axial end thereof provided with a steering shaft passing hole 137 through which the steering shaft 101 passes, and an outer circumferential partition wall 138 extending from the end partition wall 133 in the axial direction so as to form the outer circumferential surface of the support cylinder 130. The insertion hole 132 is formed in the outer circumferential partition wall 138.

The support cylinder 130 includes a protruding inner wall 134 protruding radially inwardly on one side of the inner circumferential surface of the outer circumferential partition wall 138, the insertion hole 132 into which the insertion shaft 140 is inserted into the protruding inner wall 134 is disposed in the protruding inner wall 134, and the insertion shaft 140 is coupled to the telescopic driver 107 via a fixing bracket 150.

The protruding inner wall 134 provided on the inner circumferential surface of the support cylinder 130 extends from one end to the opposite end in the axial direction of the support cylinder 130 to maintain the rigidity of the support cylinder 130 and to allow steering shaft 101 to be supported and slide even though a rotation moment is generated in the steering column during collapsing.

In addition, the inner circumferential surface of the protruding inner wall 134 has a curved surface corresponding to the outer circumferential surface of the steering shaft 101 and is provided with a gap in the radial direction from the outer circumferential surface of the steering shaft 101 such that interference with the steering shaft 101 does not occur.

In addition, the support cylinder 130 has support holes 131, which are elongated at the opposite sides of the end partition wall 133, respectively, and a flat portion 136 is provided on the outer peripheral partition wall 138 at a position corresponding to the support holes 131 in the radial direction from the steering shaft passing hole 137.

That is, the support cylinder 130, which has a substantially cylindrical shape, has an end partition wall 133 provided at one axial end thereof, the steering shaft passing hole 137 is disposed at the center of the end partition wall 133, the support holes 130, into each of which the bending clip 160 is inserted, are formed as long slits on the outer edge portion of the end partition wall 133 at the opposite sides.

In addition, the outer peripheral partition wall 138 adjoining the support holes 131 has the flat portion 136 parallel to the support holes 131, and the one end 160a of the bending clip 160 is disposed between the flat portion 136 and the column tube 120.

In addition, the support cylinder 130 include the insertion hole 132 and the support hole 131 at radially opposite positions with reference to the central axis such that at the time of vehicle collision, and thus, the forces of the insertion shaft 140 and the bending clip 160 can be balanced at the opposite sides.

The support cylinder 130 may include two or more support holes 131 to be spaced apart from each other in the circumferential direction, and at least one of the support holes 131 may be provided at a position radially opposite the insertion hole 132.

The support cylinder 130 includes a seating portion 135 protruding in the axial direction in the form of a curved surface at an edge where the end partition wall 133 and the flat portion 136 are connected such that at the time of vehicular collision, a folded portion 165 of the bending clip 160 is plastically deformed while being supported on the seating portion 135 whereby the folded portion 165 of the bending clip 160 is smoothly deformed without being engaged at the time of plastic deformation when the folded portion 165 of the bending clip 160 is unfolded.

In addition, the bending clip 160 is inserted into the support hole 131 while the folded portion 165 wraps the seating portion 135, and when performing the collapse movement together with the column tube 120, the bending clip 160 is plastically deformed while being supported by the folded portion 165 and performs positional movement while being supported by the support hole 131.

The bending clip 160 further includes a step portion 162, which is stepped such that the one end 160a fixed to the inner circumferential surface of the column tube 120 protrudes radially outward.

In addition, the outer circumferential surface of the bending clip 160 from the step portion 162 to the one end 160a is formed in a curved surface corresponding to the inner circumferential surface of the column tube 120.

A fixing groove 122 is disposed in the inner circumferential surface of the column tube 120 to open at the end of the column tube 120 such that the bending clip 160 is inserted from the step portion 162 to the one end 160a such that the one end 160a of the bending clip 160 is inserted into the fixing groove 122 and fixed by welding, fusion, or the like.

The support cylinder 130 further includes a first support portion 134a on the outer circumferential partition wall 138 at a position where the insertion hole 132 is formed, in which the first support portion 134a has an outer circumferential surface protruding outwardly to be supported by the inner circumferential surface of the column tube 120, and further includes a second support portion 139 on the outer circumferential partition wall 138 in which the second support portion 139 has an outer circumferential surface protruding outward to be supported by the inner circumferential surface of the column tube 120.

As illustrated in FIGS. 4 and 7, in the support cylinder 130, the opposite side corners of the first support portion 134a are foamed in curved surfaces corresponding to the inner circumferential surface of the column tube 120 such that even if a rotation moment is generated in the steering column when the column tube 120 performs collapse sliding, the support cylinder 130 slides without being jammed in or engaged with the column tube 120.

In addition, the second support portion 139 is provided at one end of the outer circumferential partition wall 138, and the outer circumferential surface of the second support portion 139 is formed in convex curved surfaces corresponding to the inner circumferential surface of the column tube 120 such that even if a rotation moment is generated in the steering column when the column tube 120 performs collapse sliding as described above, the support cylinder 130 slides without being jammed in or engaged with the column tube 120.

As illustrated in FIGS. 4 and 7, a plurality of second support portions 139 may be provided on respective outer circumferential partition walls 138 on the opposite sides of the flat portion 136 located at the positions radially opposite the insertion holes 132 of the support cylinder 130.

Therefore, when the support cylinder 130 is viewed in the axial direction, the first support portion 134a and a pair of second support portions 139 are disposed at positions opposed to each other in the radial direction, and the second support portions 139 are disposed at symmetrical positions at the opposite sides.

Therefore, even if a rotation moment is generated in the steering column at the time of vehicle collision, the first support portion 134a and the second support portions 139 are supported by the inner circumferential surface of the column tube 120. Thus, the interference of the collapse sliding of the column tube 120, which is caused due to the generation of the rotational force of the support cylinder 130, does not occur.

That is, at the time of vehicular collision, a rotation moment is generated due to the installation angle of the steering shaft 101 and the steering column with respect to the vehicle body, which may cause a phenomenon in which the fixed support cylinder 130 and the sliding column tube 120 are engaged with each other. However, even if the rotation movement is generated due to the collision, the column tube 120 is capable of collapsing without being disturbed in sliding since the first support portion 134a and the second support portions 139 of the support cylinder 130 support the inner circumferential surface of the column tube 120.

Since the bending clip 160 is supported on the support cylinder 130 and the column tube 120 and the bending clip 160 are coupled to each other, when the column tube 120 collapses at the time of vehicular collision, the support cylinder 130 collapses while being supported by the inner circumferential surface of the column tube, thereby absorbing the collision energy. At this time, the plastic deformation of the bending clip 160 is performed, thereby increasing the collapse load so as to further absorb the impact energy.

In addition, when the thickness or the material of the bending clip 160 is changed according to the collision characteristics or load of the vehicle, it is possible to improve the collision performance without developing separate components to be suitable for a collision characteristic for each type of vehicle.

According to embodiments having configurations and shapes disclosed above, a collapsable and slidable component smoothly collapses at the time of vehicular collision without interfering with a fixed component.

In addition, according to embodiments disclosed herein, adjustment of a collapse load of the steering column can be facilitated at the time of vehicular collision, collision performance can be improved by adjusting the collapse load according a collision characteristic for each type of vehicle, and the number of components, the number of assembly processes, and costs can be reduced.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steering column for a vehicle, comprising:
   a column tube coupled to an outer side of a steering shaft and having a collapse elongated-hole extending in an axial direction at one side of the column tube;
   a column housing coupled to an outer circumferential surface of the column tube and having a telescopic elongated-hole extending axially at one side of the column housing to correspond to the collapse elongated-hole;
   a support cylinder coupled between the column tube and the column housing, and the support cylinder having:
      an insertion hole, into which an insertion shaft passing through the telescopic elongated-hole and the collapse elongated-hole from an outer side of the column housing is inserted; and
      a support hole penetrating through the support cylinder in the axial direction; and
   a bending clip having a first end fixed to an inner circumferential surface of the column tube and a second end folded to be inserted into the support hole while wrapping an end of the support cylinder, such that at a time of vehicular collision, the bending clip moves in the axial direction together with the column tube while being plastically deformed.

2. The steering column of claim 1, wherein the support cylinder comprises:
   an end partition wall disposed at one axial end of the support cylinder, the end partition wall having a steering shaft passing hole through which the steering shaft passes; and
   an outer circumferential partition wall, extending from the end partition wall in the axial direction as the outer circumferential surface of the support cylinder, such that the insertion hole passing through the outer circumferential partition wall.

3. The steering column of claim 2, wherein the support cylinder includes a protruding inner wall protruding radially inward on an inner circumferential surface of the outer circumferential partition wall, and the insertion hole passes through the protruding inner wall.

4. The steering column of claim 3, wherein the protruding inner wall extends from a first end to a second end of the support cylinder in the axial direction on an inner circumferential surface of the support cylinder.

5. The steering column of claim 4, wherein an inner circumferential surface of the protruding inner wall has a curved shape corresponding to the outer circumferential surface of the steering shaft, and
   the inner circumferential surface of the protruding inner wall has a radial gap with the outer circumferential surface of the steering shaft.

6. The steering column of claim 2, wherein the support cylinder has a flat portion parallel to the support hole on the outer circumferential partition wall at a position corresponding to the support hole in a radial direction from the steering shaft passing hole.

7. The steering column of claim 6, wherein the insertion hole and the support hole are radially opposite to each other with reference to a central axis of the support cylinder.

8. The steering column of claim 6, wherein the support cylinder includes two or more support holes spaced apart from each other in a circumferential direction, and at least one of the two or more support holes is located at a position radially opposite the insertion hole.

9. The steering column of claim 6, wherein the support cylinder further includes a seating portion protruding in the axial direction at a corner at which the end partition wall is connected to the flat portion, the seating portion having a curved surface.

10. The steering column of claim 9, wherein the bending clip is inserted into the support hole while wrapping the seating portion by the second end which is a folded portion of the bending clip.

11. The steering column of claim 1, wherein the bending clip includes a step portion, which is stepped such that the first end fixed to the inner circumferential surface of the column tube protrudes radially outward.

12. The steering column of claim 11, wherein the bending clip has a curved surface of which an outer circumferential surface from the step portion to the first end corresponds to the inner circumferential surface of the column tube.

13. The steering column of claim 12, wherein the column tube includes a fixing groove on the inner circumferential surface thereof and the bending clip is inserted into and fixed to the fixing groove from the step portion to the first end.

14. The steering column of claim 8, wherein the support cylinder further includes a first support portion on the outer circumferential partition wall at which the insertion hole is disposed, the first support portion having an outer circumferential surface protruding outward to be supported by the inner circumferential surface of the column tube.

15. The steering column of claim 14, wherein the first support portion has opposite corners which have curved surfaces corresponding to the inner circumferential surface of the column tube.

16. The steering column of claim 15, wherein the support cylinder further includes a second support portion on the outer circumferential partition wall, the second support portion having an outer circumferential surface protruding outward to be supported by the inner circumferential surface of the column tube.

17. The steering column of claim 16, wherein the second support portion is disposed at one axial end portion of the outer peripheral partition wall, and wherein the outer circumferential surface of the second support portion has a curved surface corresponding to the inner circumferential surface of the column tube.

18. The steering column of claim 16, wherein the outer circumferential partition wall is provided in at least two or more such that the second support portion is disposed on each of the at least two or more outer circumferential partition walls on opposite sides of the flat portion at a position radially opposite the insertion hole in the support cylinder.

19. The steering column of claim 1, wherein the insertion shaft passes through the insertion hole of the support cylinder and the telescopic elongated-hole to be coupled to a telescopic driver via a fixing bracket.

20. The steering column of claim 19, wherein the insertion shaft has a stepwise outer diameter such that a first diameter at one end portion of the insertion shaft is smaller than a second diameter at a middle portion of the insertion shaft to be fitted into the insertion hole and a third diameter at another end portion of the insertion shaft is bigger than the second diameter to be secured by the fixing bracket.

* * * * *